US006757678B2

(12) United States Patent
Myllymaki (10) Patent No.: US 6,757,678 B2
(45) Date of Patent: Jun. 29, 2004

(54) GENERALIZED METHOD AND SYSTEM OF MERGING AND PRUNING OF DATA TREES

(75) Inventor: Jussi Petri Myllymaki, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 245 days.

(21) Appl. No.: 09/834,965

(22) Filed: Apr. 12, 2001

(65) Prior Publication Data

US 2002/0188598 A1 Dec. 12, 2002

(51) Int. Cl.[7] .............................................. G06F 17/30
(52) U.S. Cl. ......................................................... 707/6
(58) Field of Search ........................... 707/3, 6, 104.1, 707/530, 531, 532

(56) References Cited

U.S. PATENT DOCUMENTS

| | | | |
|---|---|---|---|
| 4,799,152 A | | 1/1989 | Chuang et al. ................. 707/7 |
| 5,412,384 A | | 5/1995 | Chang et al. .................. 341/79 |
| 5,534,861 A | | 7/1996 | Chang et al. .................. 341/79 |
| 5,787,274 A | | 7/1998 | Agrawal et al. ............. 707/102 |
| 5,852,826 A | | 12/1998 | Graunke et al. ................ 707/7 |
| 5,870,735 A | | 2/1999 | Agrawal et al. ................ 707/3 |
| 5,875,327 A | * | 2/1999 | Brandt et al. ................... 713/1 |
| 5,945,992 A | | 8/1999 | Cunniff ....................... 345/335 |
| 6,092,064 A | | 7/2000 | Aggarwal et al. .............. 707/6 |
| 6,105,062 A | | 8/2000 | Andrews et al. ............ 709/223 |
| 6,366,876 B1 | * | 4/2002 | Looney ........................ 703/25 |
| 6,418,429 B1 | * | 7/2002 | Borovoy et al. ................ 707/3 |
| 6,493,663 B1 | * | 12/2002 | Ueda ............................. 704/9 |

OTHER PUBLICATIONS

P. tester and S. E. Smith, "Algorithm For Determining The Structure Of Physical Data Bases", IBM Technical Disclosure Bulletin, vol. 16, No. 10, Mar. 1974.

* cited by examiner

Primary Examiner—Safet Metjahic
Assistant Examiner—Haythim J. Alaubaidi
(74) Attorney, Agent, or Firm—Samuel A. Kassatly (57) ABSTRACT

An automated system and associated method for building a comprehensive database of a configurable entity that is available from one or more Web sites, while removing redundancies. The system merges data tree structures that contain redundant data into more tractable data tree structures where those redundancies have been removed. More specifically, a feature of the present system is to automate the process of collecting information from one or more Web sites and convert the raw data into a logically fashioned, non-redundant tree structure. Advantageously, Web users would be able to retrieve information stored on one or more Web pages and locally merge the data.

18 Claims, 8 Drawing Sheets

GENERALIZED METHOD AND SYSTEM OF MERGING AND PRUNING OF DATA TREES

FIELD OF THE INVENTION

The present invention relates generally to electronic tree-structured data, available over a network, such as the Internet, for entities available at one or even several Web sites. More particularly, the invention relates to an automated system and associated method for building a comprehensive database of a configurable (with different options) entity that is available from one or more Web sites, while removing redundancies.

BACKGROUND OF THE INVENTION

The World Wide Web (WWW) comprises an expansive network of interconnected computers upon which businesses, governments, groups, and individuals throughout the world maintain inter-linked computer files known as web pages. One of the key features of the Web is the wide array and large amount of information available to users. With vast number of WWW sites and the potentially large amount of data available from any given site, redundancy of information is commonplace. This redundancy can limit the effectiveness of searches by simply overwhelming the search engine and/or its user.

In contradistinction, a limited display of data at Websites, either by design or by constraint, often limits the usefulness and utility of the information. Often the Website contains only static, predefined information making it difficult to extract the needed information from the site. Thus, there is a need among individual users, as well as e-businesses, for a data mining tool that can filter the information available on the Web, removing redundancy and extracting data that has been purposely made difficult to decode, decipher or analyze.

The introduction of Web content based on the Extensible Markup Language (XML) has spawned immense growth in the number of publicly available documents that contain tree-structured data. Each tree structure has a root from which branches, nodes and leaves may emanate. Inherently, tree structures allow information to be represented in very fine detail and data to be logically grouped, often into entities known as subtrees. Also inherent in the tree structure of XML is the potential for eliminating redundancy with an appropriate algorithm. Removing the redundancy can greatly enhance the viability and utility of the data. Subtree extraction can also make otherwise undecipherable information obvious to the user.

For example, a situation may exist where an individual or a corporation wishes to build a comprehensive database of some configurable entity published on the Internet, but the publisher makes only a portion of the configuration data visible at any one time. A common example might be that of a computer, which exemplifies an entity that can be configured with many different options (hard disk drives and memory boards of different capacities, CPUs of different clock speeds, etc.). Some computer manufacturers provide a limited interface for browsing this configuration data on their Web site. Pages of the Web site often display only a static, predefined configurations for their computers. In particular, the page might display the configuration and price of a specific desktop computer pre-configured with a given hard disk drive and specific amount of memory. If users wish to see the price of another configuration of the same computer, they must enter different values into a query form or follow a different hyperlink, and then wait for the new configuration and price data to appear.

The process of sequentially requesting the configuration and price information of each pre-configured computer inhibits, and perhaps eliminates, the possibility of a timely comparative analysis of the entire product portfolio of the computer manufacturer. Having a comprehensive database of all the possible configurations of the manufacturer's computers would be extremely useful and even profitable to an end-user. In many cases the pages displaying the various configurations are very similar in structure and content, and both can be viewed as instances of a tree-like data structure.

There is therefore an unsatisfied need for a mechanism for retrieving and processing individual tree data structures from the pages of one or more Web sites and then merging them locally. The need for such an adaptive mechanism and corresponding process has heretofore remained unsatisfied. In the case of the various computer configurations, the user, with the aid of an appropriate tool, would be able to logically connect the different variations of the same computer, create a better tree data structure and, ultimately, be able to deduce the appropriate underlying features. As a point of fact, the tree structure could either be the presentation itself, or some other tree data structure extracted from the presentation (e.g. price data structure).

SUMMARY OF THE INVENTION

The present invention addresses these and other data analysis needs by incorporating a method for merging tree data structures that contain redundant data, into more tractable tree data structures where those redundancies have been removed. Advantageously, Web users are able to retrieve information stored on one or more Web pages, available from one or more Web sites and locally merge the data. While Web site owners may have good reasons not to make their product database easily extractable and therefore display only a limited view of the data at a time, the present invention describes a mechanism for bypassing this restriction.

The system and associated method of the present invention provide for a generalized, automated method for merging and pruning data trees. The resulting tree structure or the data extracted from the tree structure can be the end product. More specifically, a feature of the present system is to automate the process of collecting information from one or more Web sites and convert the raw data into a logically fashioned, non-redundant tree structure.

The present system provides several features and advantages among which are the following:

It provides a means of retrieving sets of individual Web pages from Web sites and locally merging the data.

It enables the user to obtain logical tree data structure where redundancies have been removed.

It enables the user to bypass the built-in restrictions in product databases to effectively mine the data for information.

It permits comparative analysis of the data that would otherwise be difficult or impossible.

Briefly, the foregoing and other features and advantages of the present invention are realized by a system and associated method for automating a method of extracting and reducing tree-structured data from one or more Web pages, residing at one or more Web sites. The system and method include:

A MERGE feature that determines how two matching nodes are to be integrated. Specifically, the MERGE feature is used as a child, or subordinate, node to describe how matching parent nodes are to be combined. In addition the MERGE feature has an attribute what specifies what is to be done to the output when two tree nodes match.

A MATCH feature that is used to describe how and when two nodes match or overlap. In particular, the MATCH feature includes an attribute that specifies the matching condition.

A UNIQUE functionality that specifies that duplicates potentially generated by MERGE nodes are to be removed. This functionality results in the removal of duplicate values generated by the function of selecting information at a given level in the tree structure from a matching document. The removal of duplicate elements results in a set of unique values or elements that still contain the common values.

When used to evaluate tree data at web-sites, the system of the present invention will transform the information into a new tree structure with most, if not all redundancy removed. Users employing the system of the present invention will be able to logically group and reduce data by removing redundancies and, thus, obtain, as an end produce, the resulting tree structure or the data generated from the tree structure. The system is implementable in a local computer and may be employed by businesses and other users who need its capabilities in the field of data analysis.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

FIG. 4, which is comprised of FIGS. 4A, 4B and 4C, and FIGS. 5, 6, 7, and 8 illustrate a sequence of events that are inherent in the operation of the merging and pruning system of FIG. 1.

DETAILED DESCRIPTION OF PREFERRED EMBODIMENTS

The following definitions and explanations provide background information pertaining to the technical field of the present invention, and are intended to facilitate the understanding of the present invention without limiting its scope:

E-business, e-shopping, or e-commerce transactions: Business transactions conducted online using the Internet or another communications network.

HTML (Hypertext Markup Language): A standard language for attaching presentation and linking attributes to informational content within documents. During a document authoring stage, HTML "tags" are embedded within the informational content of the document. When the web document (or "HTML document") is subsequently transmitted by a web server to a web browser, the tags are interpreted by the browser and used to parse and display the document. In addition to specifying how the web browser is to display the document, HTML tags can be used to create hyperlinks to other web documents.

HTTP (HyperText Transfer Protocol): the protocol most often used to transfer information from World Wide Web servers to browsers.

Internet: A collection of interconnected public and private computer networks that are linked together with routers by a set of standard protocols to form a global, distributed network.

Search engine: A remotely accessible World Wide Web tool that allows shoppers to conduct keyword searches for information on the Internet.

Server: A software program or a computer that responds to requests from a web browser by returning ("serving") web documents.

Tree structure: A means of representing data in a hierarchical fashion such that the information consists of a root, branches and leaves. Branches join at nodes. Alternatively, the tree structure may be described in terms of parent-child relationships.

URL (Uniform Resource Locator): A unique address that fully specifies the location of a content object on the Internet. The general format of a URL is protocol://server-address/path/filename.

Web browser: A software program that allows shoppers to request and read hypertext documents. The browser gives some means of viewing the contents of web documents and of navigating from one document to another.

Web document or page: A collection of data available on the World Wide web and identified by a URL. In the simplest, most common case, a web page is a file written in HTML and stored on a web server. It is possible for the server to generate pages dynamically in response to a request from the shopper. A web page can be in any format that the browser or a helper application can display. The format is transmitted as part of the headers of the response as a MIME type, e.g. "text/html", "image/gif". An HTML web page will typically refer to other web pages and Internet resources by including hypertext links.

Web site: A database or other collection of inter-linked hypertext documents ("web documents" or "web pages") and associated data entities, which is accessible via a computer network, and which forms part of a larger, distributed informational system such as the WWW. In general, a web site corresponds to a particular Internet domain name, and includes the content of a particular organization. Other types of web sites may include, for example, a hypertext database of a corporate "intranet" (i.e., an internal network which uses standard Internet protocols), or a site of a hypertext system that uses document retrieval protocols other than those of the WWW.

World Wide Web (WWW also web): An Internet client—server hypertext distributed information retrieval system.

XML: extensible Markup Language. A standard, semi-structured language used for web documents. During a document authoring stage, XML "tags" are embedded within the informational content of the document. When the web document (or "XML document") is subsequently transmitted by a web server to a web browser, the tags are interpreted by the browser and used to parse and display the document. In addition to specifying how the web browser is to display the document, XML tags can be used to create hyperlinks to other web documents.

Figure 1:
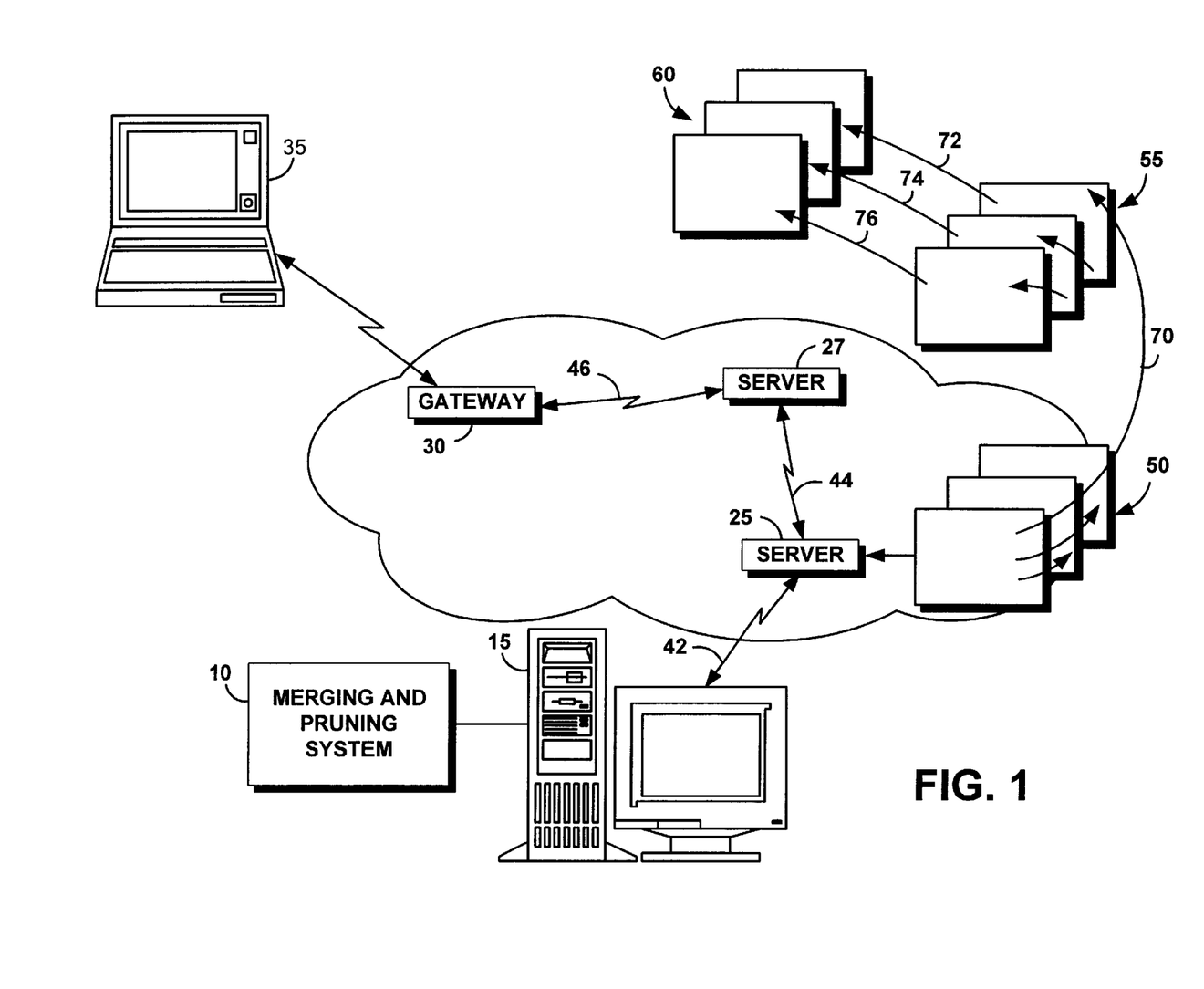
FIG. 1 is a schematic illustration of an exemplary operating environment in which a system and associated method for automated merging and pruning of data trees may be used according to the present invention.

FIG. 1 portrays an overall environment in which a system 10 for automated merging and pruning of data trees, according to the present invention, may be used. The system 10 includes a software or computer program product that is typically embedded within, or installed, at least in part, on a host server or computer 15. Alternatively, the system 10 can be saved on a suitable storage medium such as a diskette, a CD, a hard drive, or like devices. While the system 10 will be described in connection with the WWW, the system 10 can be used with a stand-alone database of documents that may have been derived from the WWW and/or other sources.

The cloud-like communication network 20 represents for example the Internet, and is comprised of communication lines and switches connecting servers such as servers 25, 27 to gateways such as gateway 30. The servers 25, 27 and the gateway 30 provide the communication access to the Internet and other linked computers 35. These servers 25, 27 act as both a means and source information that can be queried by the host server 15 for desired information.

The host server 15 is connected to the network 20 via a communications link such as a telephone, cable, or satellite link. The servers 25 and 27 can be connected via high speed Internet network lines 42, 44, 46 to other computers and gateways. Servers 25 and 27 provide access to stored information in documents. Of particular interest with respect to this invention are those based on the XML language, indicated generally at 50, 55, and 60. The XML documents 50, 55, 60 very likely include embedded hypertext links to other related, locally stored pages, and hypertext links 70, 72, 74, 76 to other webs sites or documents 55, 60 that are stored by various web servers such as the server 27. The merging and pruning system 10 serves to process the tree-structured information stored in these representative documents 50, 55, 60.

Figure 2:
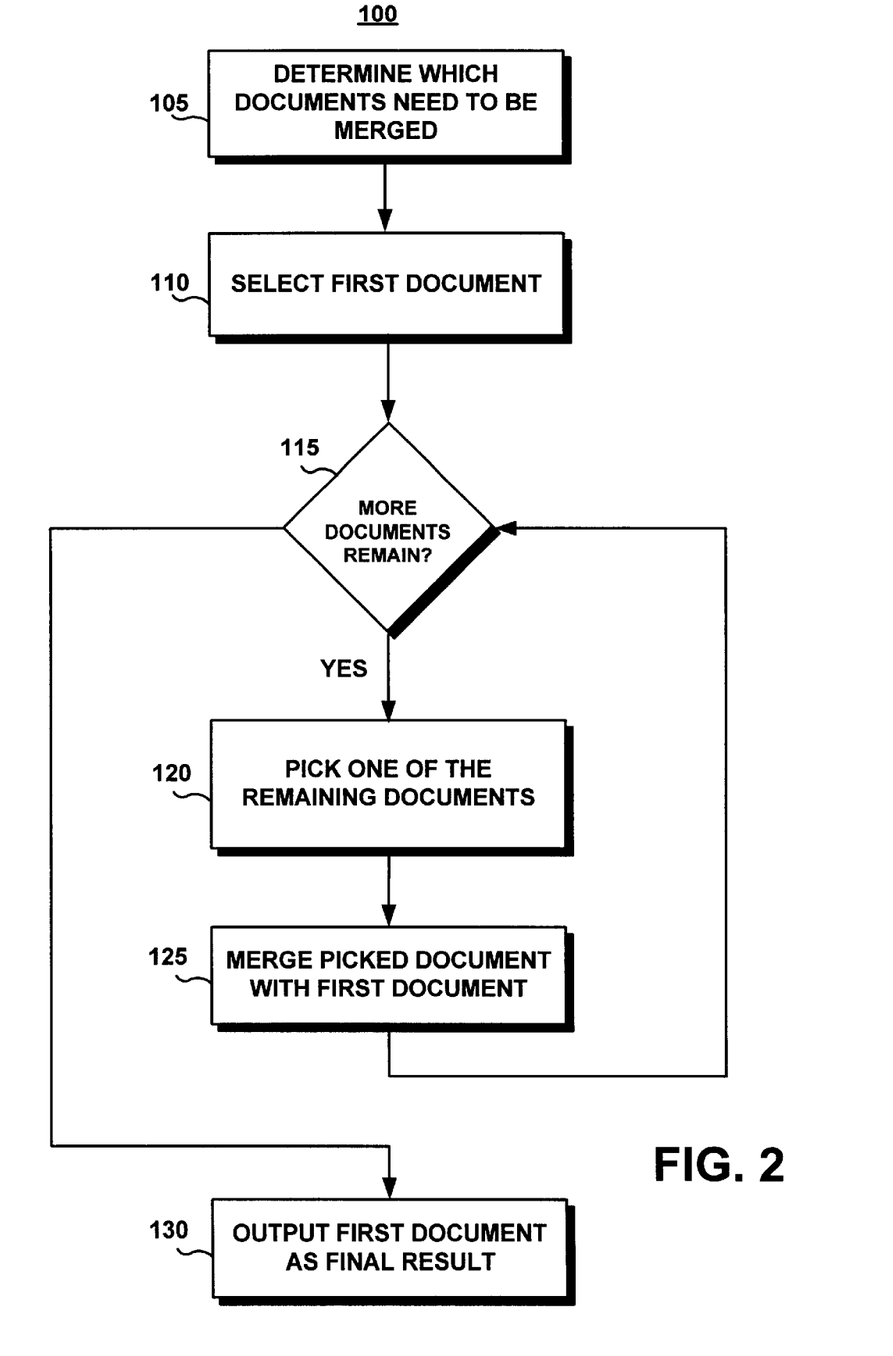
FIG. 2 is a process flow chart that illustrates an automated merging and pruning operation implemented by the system of FIG. 1.

FIG. 2 illustrates the process flow in automated merging of data trees. First, the system determines which documents need to be (or could be) merged (105). This is application-specific but typically involves identifying documents containing data trees of matching types. For instance, two documents that both contain product data for computer systems are considered matching. The set of documents to merge is usually those that have been obtained by extracting specific type of data from a Web site or Web sites, for instance all product description documents in a particular product category of a product catalog Web site.

Next, one of the documents is picked as the "first" document (110) with which other documents will be merged. Any document can be picked for serving as the first document. The remaining documents are merged with the first document, one by one (115, 120, 125). When a document is merged with the first document, it is also removed from the document collection. When no documents remain in the document collection, the merge process is complete and the final result, namely all documents merged with the first document, can be output (130).

Figure 3:
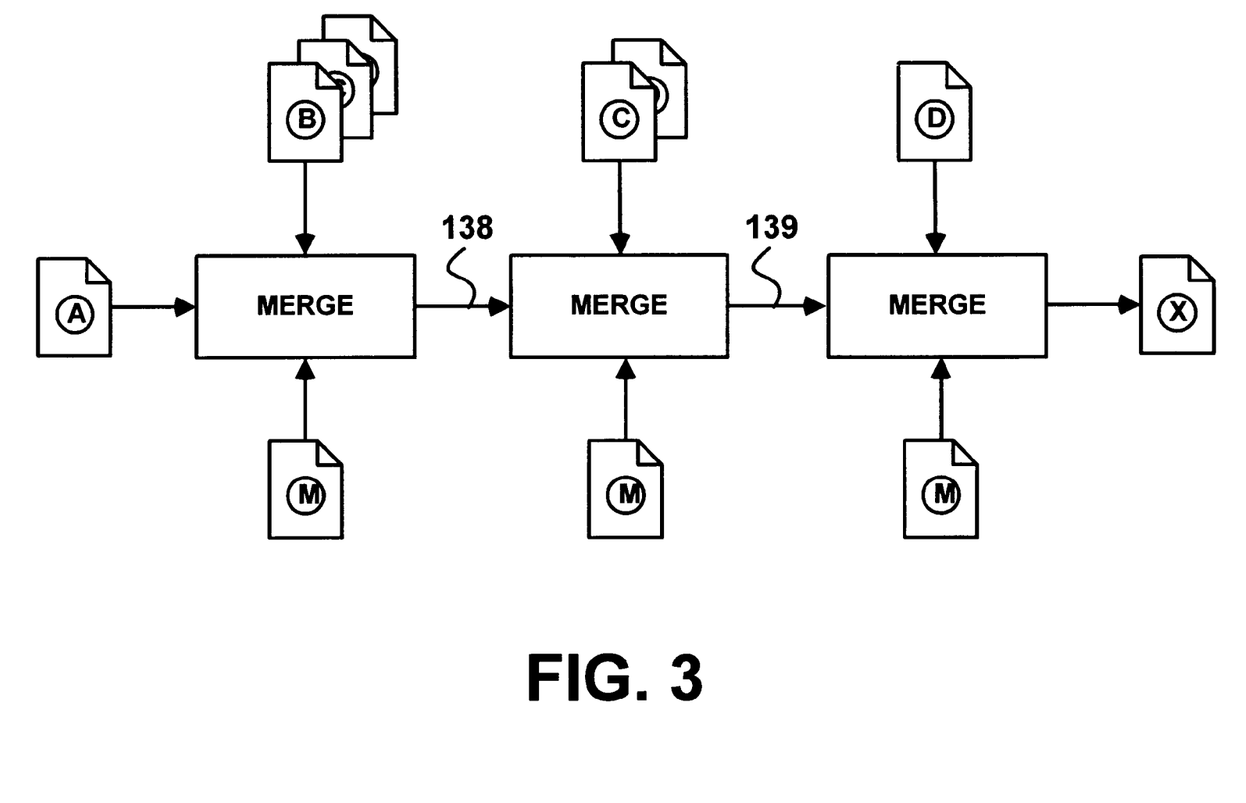
FIG. 3 is a detailed block diagram illustrating an exemplary case in which the automated merging and pruning system of FIG. 1 is employed.

FIG. 3 further illustrates an exemplary case in which the system 10 of FIG. 1 is employed. A group of four related input XML documents A, B, C, D that are obtained, for example, from various sources on the World Wide Web, are processed by the system 10 to generate a new merged and pruned output document X, that contains all of the information of the individual input documents A, B, C, D but without redundancy.

The following example, expressed using the Extensible Markup Language (XML) syntax, illustrates typical content in a document A.

```
<SYSTEM NAME="ComputerA" PRICE="1800">
    <COMPONENT NAME="CPU">
        <OPTION NAME="Intel 600 MHz" PRICE="100"/>
    </COMPONENT>
    <COMPONENT NAME="DISK">
        <OPTION NAME="IDE 10 GB" PRICE="100"/>
    </COMPONENT>
</SYSTEM>
```

The following example, expressed using the Extensible Markup Language (XML) syntax, illustrates typical content in a document X.

```
<SYSTEM NAME="ComputerA" PRICE="1800">
    <COMPONENT NAME="CPU">
        <OPTION NAME="Intel 600 MHz" PRICE="100"/>
        <OPTION NAME="Intel 700 MHz" PRICE="200"/>
        <OPTION NAME="Intel 800 MHz" PRICE="300"/>
    </COMPONENT>
    <COMPONENT NAME="DISK">
        <OPTION NAME="IDE 10 GB" PRICE="100"/>
        <OPTION NAME="IDE 20 GB" PRICE="150"/>
        <OPTION NAME="IDE 30 GB" PRICE="200"/>
    </COMPONENT>
</SYSTEM>
```

An important functionality of the system 10 of FIG. 1, as applied to the plurality of documents, is represented by a merge document M, which contains both the matching and merging instructions or rules to be applied to the input documents A, B, C, and D. In particular, the root node of the first document A is paired with the root node of the other documents B, C, D. If a matching root node is found, the two trees are merged to form a new document. Their sub-tree nodes are subsequently merged in a recursive fashion, again following the instructions contained in the merge document M.

The following example, expressed using the Extensible Markup Language (XML) syntax, illustrates typical contents of a merge document.

```
<SYSTEM>
    <MATCH TEST="$1/@NAME == $2/@NAME"/>
    <MERGE SELECT="$1/@*"/>
    <COMPONENT>
        <MATCH TEST="$1/@NAME == $2/@NAME"/>
        <MERGE SELECT="$1/@*"/>
        <UNIQUE>
            <MERGE SELECT="$1/OPTION"/>
            <MERGE SELECT="$2/OPTION"/>
        </UNIQUE>
    </COMPONENT>
</SYSTEM>
```

Also contained in the merge document M are the details of how redundant information is to be discarded. In the particular example of FIG. 3, the first input document A is merged with the second input document B. The product 138 of the input documents A and B is compared and merged with the next input document. The product 139 of this combination is compared and merged with the next input document D. The final product, which in this example is the output document X, contains all of the information of the individual input documents but without replicated information.

While the recursive process is illustrated in FIG. 2 and described herein as being implanted in a sequential manner, i.e., in series, it should be understood that the merging and pruning operation of the present invention may be processed in parallel. As an illustration, the first and second input documents A and B, may be merged in accordance with the rules of the merge document M, and the other two input documents C and D, may also be similarly merged concurrently with, but independently of the input documents A and B. Subsequently, the two products of the two independent merging operations (A, B) and (C, D) will be merged also in according with the rules of the merge document M.

Figure 4A:
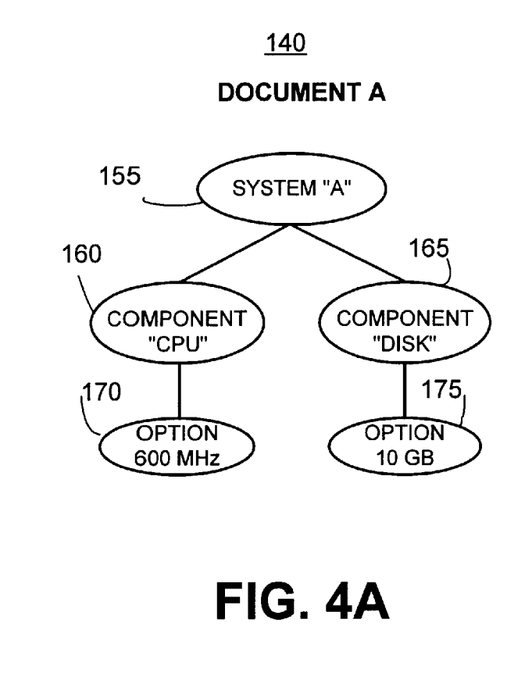
Figure 4B:
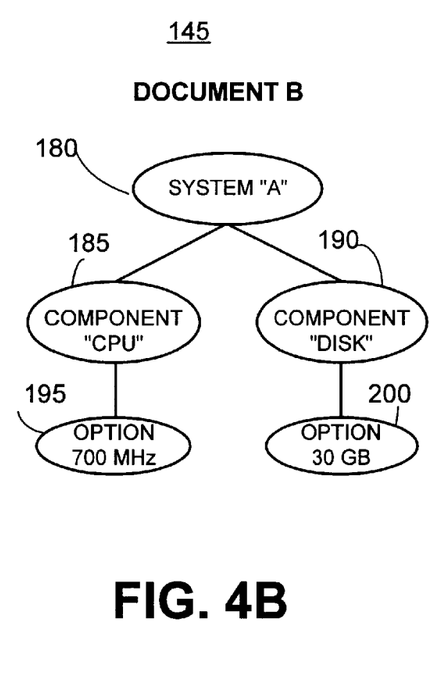
Figure 4C:
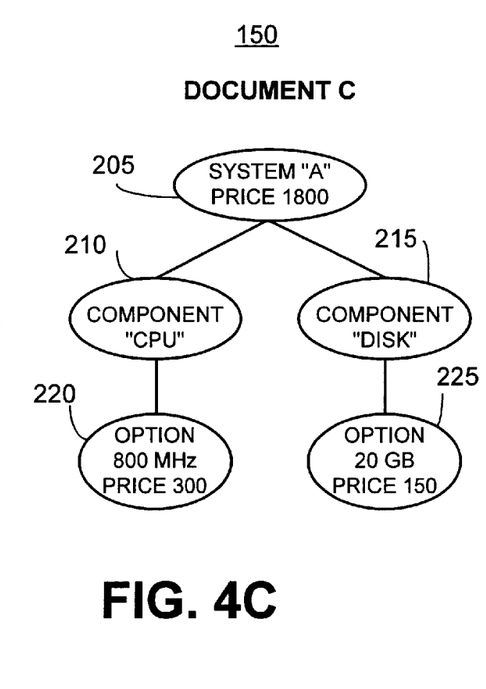

In operation, and with further reference to FIG. 4 (FIGS. 4A, 4B, 4C), the system 10 of FIG. 1 may be understood to compare the data of three data trees, namely those of input documents A, B, and C. As a concrete example, consider a situation where each of these input documents provides data related to a specific type of computer.

Input document A can be represented by a data tree 140, that contains a root node, System A, designated by the reference numeral 155, with components CPU 160 that refers to the speed of the central processor unit, and Disk 165 that refers to the storage capacity, as well as CPU Option 170 and Component Disk Option 175. Similarly, input document B can be represented by a data tree 145, that contains a root node, System A, designated by the reference numeral 180, with components CPU 185 and Disk 190, as well as CPU Option 195 and Component Disk Option 200. Finally, input document C can be represented by a data tree 150, that contains a root node, System A, designated by the reference numeral 205, with components CPU 210 and Disk 215, as well as CPU Option 220 and Component Disk Option 225.

In the initial pass of the input documents A, B, C through the system 10, the system 10 recognizes that the three data trees 140, 145, and 150 contain identical roots 155, 180, and 205 and thus they pertain to the same commodity. In particular, the system 10 observes, in this exemplary case, that the data trees 140, 145, and 150 all contain System "A" which is a specific type of computer.

Figure 5:
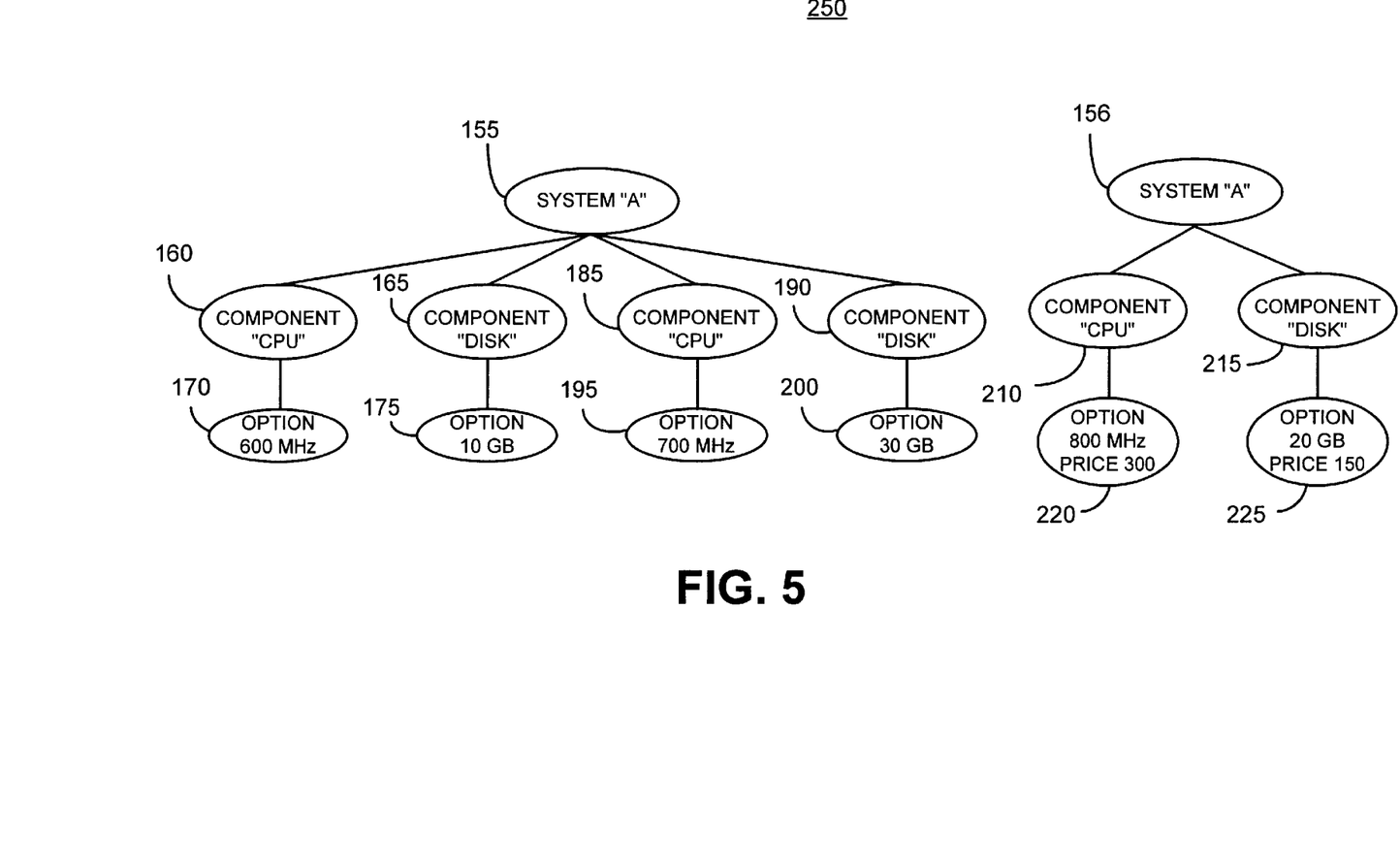
Figure 6:
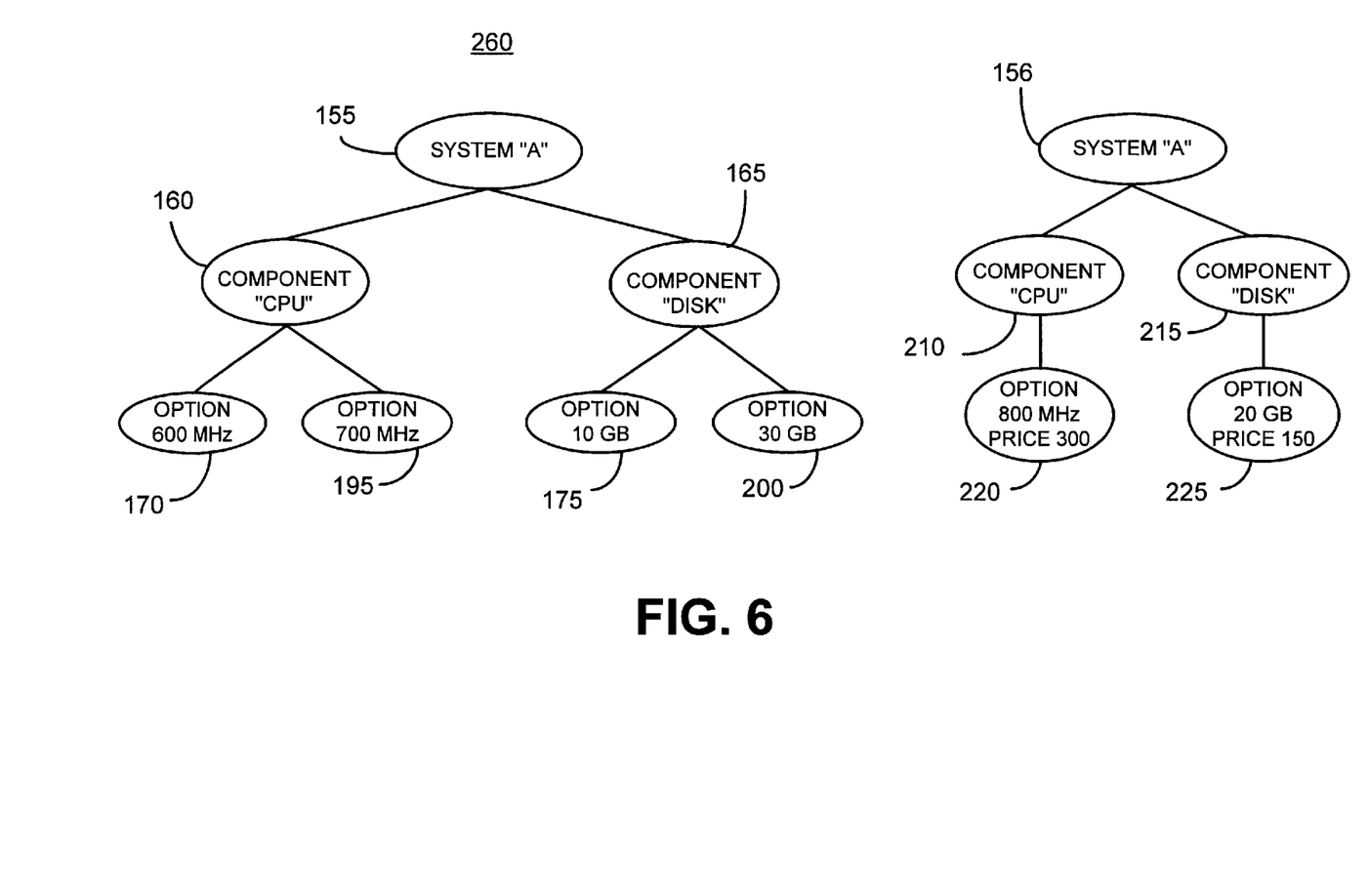
Figure 7:
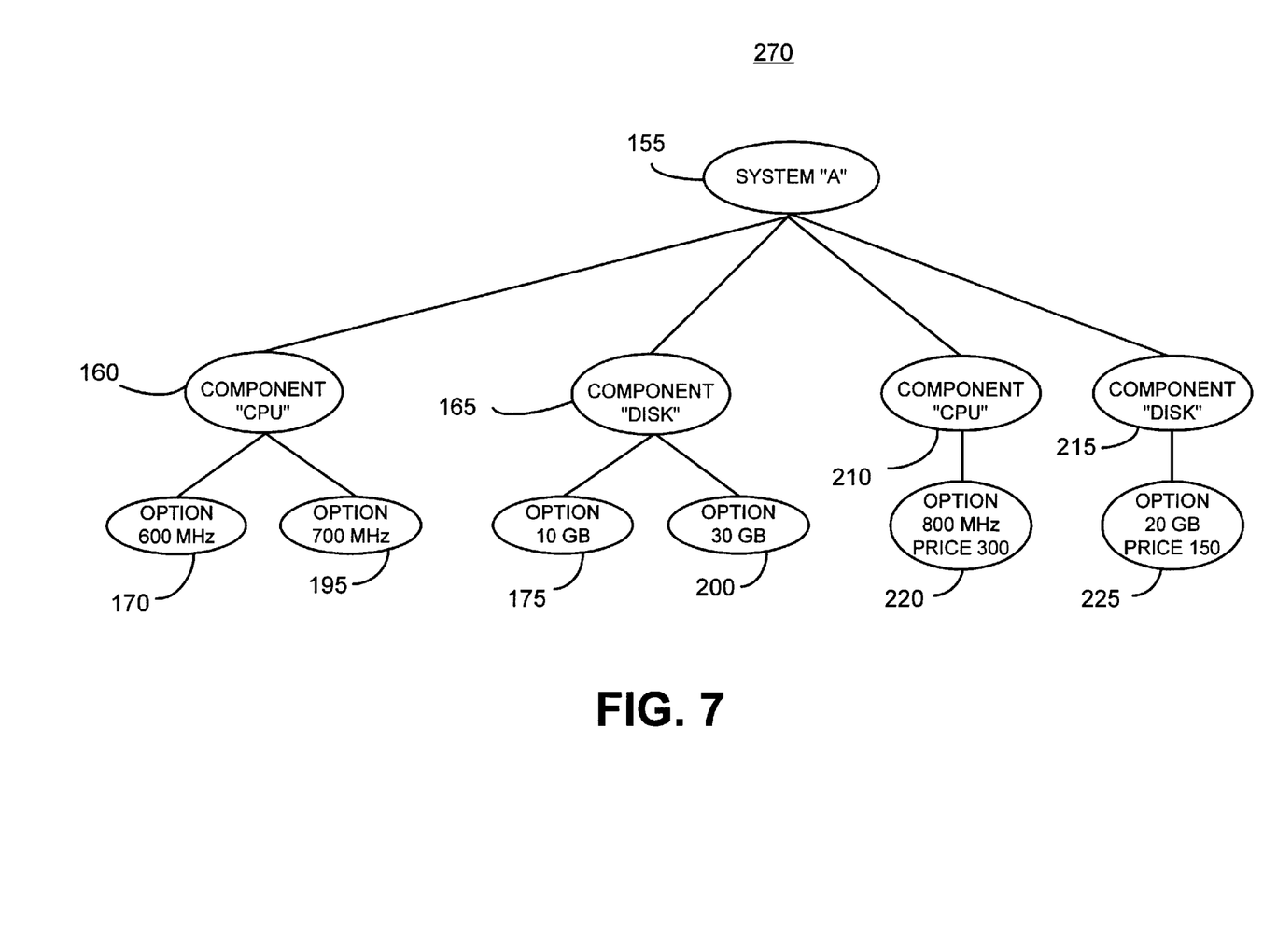

Based on this finding, the system 10 merges the three trees 140, 145, and 150 into a new data tree 250, as illustrated in FIG. 5. The data tree 250 initially comprises all the nodes 160, 165, 170, 175, 185, 190, 195, 200, 210, 215, 220, and 225 of the input documents A, B, and C, including redundant nodes.

As explained earlier in connection with FIGS. 2 and 3, a series of recursive passes by the system 10 uncovers the fact that components 160, 185, and 210 refer to the same subcomponent, namely the CPU. As a result, similar subnodes 165, 190, and 215 that correspond to these nodes 160, 185, and 210 are determined by the system 10 to be redundant.

Figure 8:
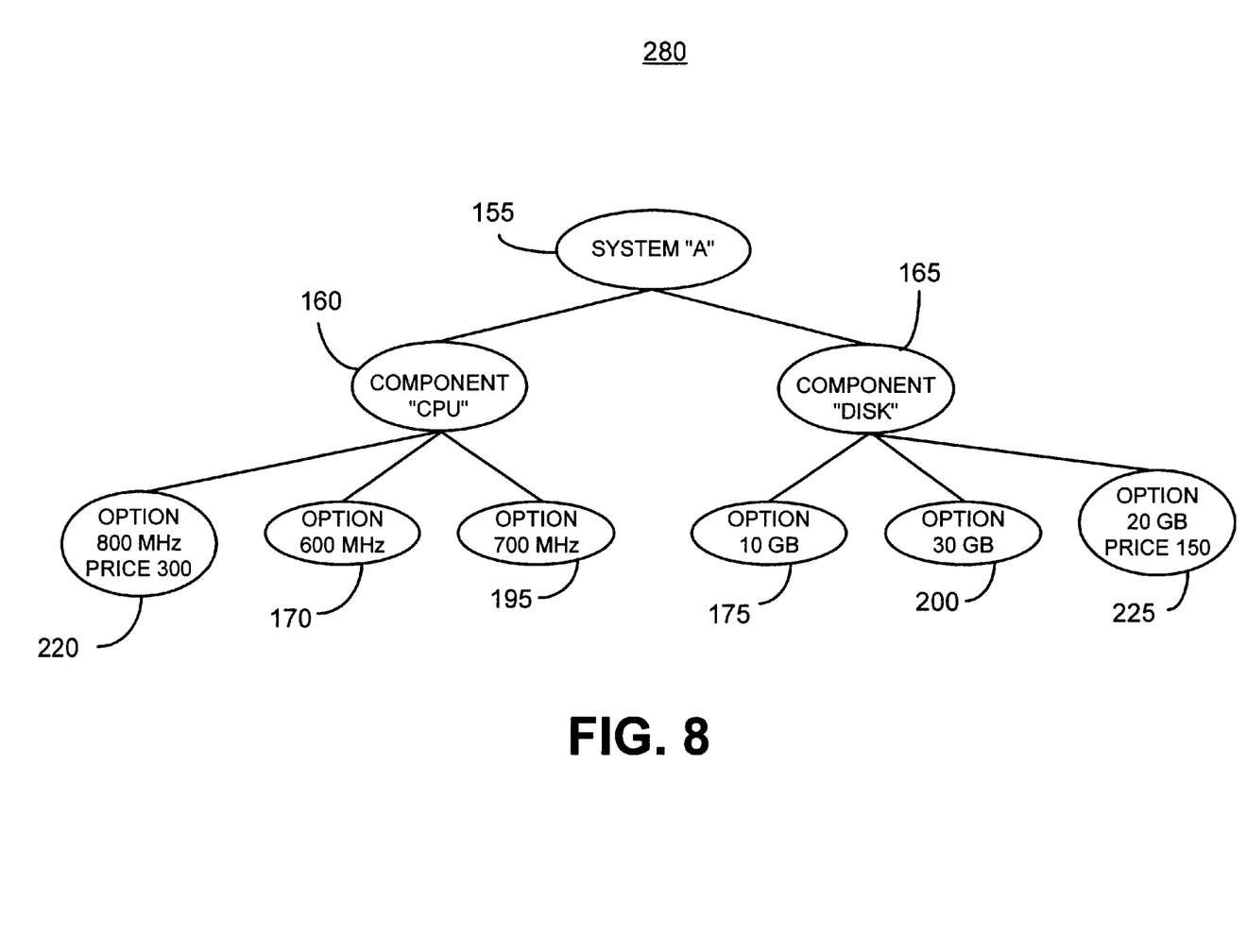

These redundancies are removed in a MERGE process, resulting in an output data tree 260 of FIG. 8. In particular, two of three "CPU" nodes and two of three "Disk" nodes are removed, leaving a data tree with no redundancies, i.e., no redundant nodes. In this particular case the remaining node "CPU" is 160, the node "Disk" contained in the tree is 165. The end product may be the data tree 260 of FIG. 8, or, alternatively, the information, e.g., the price structure, that is readily gleaned from the merged and pruned tree structure and heretofore, unavailable or simply obfuscated—either purposely or by the inherent structure of the information.

The following is a listing of a representative pseudocode of the software elements of the automated merging and pruning system 10 of FIG. 1. While this code has been simplified to pertain to only two data trees, due to the incremental nature of the overall process, it may be generalized with recursion aspects to apply to any number of trees.

Important features of the pseudocode include the MATCH feature which tests for specific attributes at a given hierarchical level and determines if documents have commonality and the MERGE functionality which builds a new document from the children of the individual documents, then removes redundancies using the "remove duplicates" subprogram.

```
Tree merge-docs(Doc A, Doc B, Doc M) {
    R = merge-trees(parse(A), parse(B), parse(M))
    return R
}
Tree merge-trees(Tree A, Tree B, Tree M) {
    Tree R = empty
    if (element(A) == element(B) and element(A) == element(M)
        and match(A, B, attribute(child(M, "MATCH"), "TEST"))) {
        // Trees match, merge them.
        insert-tree(R, merge(A, B, M, element(M))))
    } else {
        // Trees don't match, output both.
        insert-tree(R, A)
        insert-tree(R, B)
    }
    return R
}
Tree merge(Tree A, Tree B, Tree M, string S) {
    Tree R = new Tree(S)
    for-each Node N in children(M) {
        if (element(N) == "UNIQUE") {
            S = merge(A, B, N, S)
            insert-child-nodes (R, remove-duplicates(S))
        } else if (element(N) == "MERGE") {
            S = select-tree(A, B, attribute(N, "SELECT"))
            insert-child-nodes (R, S)
        } else if (element(N) == "MATCH") {
            // Ignore. Handled in merge-trees( )
        } else {
            // Not UNIQUE or MERGE or MATCH.
            S = merge-trees(child(A, element(N)), child(B,
                    element(N)), N, element(N))
            insert-tree(R, S)
        }
    }
    for-each Node N in children(A) {
        if (not(contains(children(M), N)))
            insert-node(R, N)
    }
    for-each Node N in children (B) {
        if (not(contains(children(M), N)))
            insert-node(R, N)
    }
    return R
}
Tree parse(Doc D) {
    read D into memory and parse it into a tree data structure
    return tree data structure
}
Tree select-tree(Tree A, Tree B, Selection S) {
    select subtrees from A and/or B as directed by S, then return
    result
}
Tree insert-tree(Tree T, Tree U) {
    insert U as a child of T and then return T
}
Tree insert-child-nodes(Tree T, Tree U) {
    for-each Node N in children(U) {
        T = insert-node (T, N)
    }
    return T
}
```

-continued

```
Tree insert-node(Tree T, Node N) {
    insert N as a child of T and then return T
}
remove-duplicates(Tree T) {
    Tree R = new Tree(element (T))
    for-each Node N in children(T) {
        boolean foundsame = false;
        for-each Node M in preceding-siblings (N) {
            if (equals(N, M)) {
                foundsame = true;
                break;
            }
        }
        if (not(foundsame))
            R = insert-child(R, N)
    }
    return R
}
boolean equals (Tree T, Tree U) {
    return true if T and U are identical
}
string element (Node N) {
    return name of N element
}
boolean match (Tree A, Tree B, Condition C) {
    return true if A and B match based on C
    return false otherwise
}
list (Node) children(Tree T) {
    return list of T's children
}
Node child (Tree T, Element E) {
    return child Node named E in T
}
string attribute (Node N, Attribute A) {
    return value of A in N
}
```

It is to be understood that the specific embodiments of the invention that have been described are merely illustrative of certain applications of the principle of the present invention. Numerous modifications may be made to the system and method for automated merging and pruning of data trees as described herein without departing from the spirit and scope of the present invention. Moreover, while the present invention is described for illustration purpose only in relation to the WWW, it should be clear that the invention is applicable as well to any device that stores data in trees or tree-like structures.

What is claimed is:

1. A method for merging matching information in related documents in a computer and pruning data trees to remove redundant information, comprising:
    identifying two or more source documents that share a similar logical data tree structure;
    within the two or more source documents identifying matching documents that relate to the same configuable entity;
    applying a merge document to the matching documents to merge the matching documents into a resulting tree merge document, and to prune the logical data tree of the resulting document; and
    wherein applying the merge document into a resulting tree merge document further comprises specifying a first instruction to select information at a predetermined level in the tree structure from a first matching document.

2. The method of claim 1, wherein applying the merge document comprises identifying a merge data tree structure of the merge document that is similar to the data tree structure.

3. The method of claim 1, wherein identifying comprises identifying two or more web documents.

4. The method of claim 1, wherein applying the merge document comprises specifying a condition that determines whether two source documents relate to the same configurable entity.

5. The method of claim 1, wherein applying the merge document further comprises specifying a second instruction to output only unique elements of the matching documents at a given level in the tree structure.

6. A software program product for merging matching information in related documents in a computer and pruning data trees to remove redundant information, comprising:
    means for identifying two or more source documents that share a similar logical data tree structure;
    means for identifying matching documents that relate to the same configurable entity within the two or more source documents;
    means for applying a merge document to the matching documents to merge the matching documents into a resulting tree merge document, and to prune the logical data tree of the resulting document; and
    wherein applying the merge document into a resulting tree merge document further comprises specifying a first instruction to select information at a predetermined level in the tree structure from a first matching document.

7. The software program product of claim 6, wherein the means for applying the merge document comprises means for identifying a merge data tree structure of the merge document that is similar to the data tree structure.

8. The software program product of claim 6, wherein the means for identifying comprises means for identifying two or more web documents.

9. The software program product of claim 6, wherein the means for applying the merge document comprises specifying a condition that determines whether two source documents relate to the same configurable entity.

10. The software program product of claim 6, wherein the means for applying the merge document further comprises means for specifying a second instruction to output only unique elements of the matching documents at a given level in the tree structure.

11. A service for merging matching information in relate documents and pruning data trees to remove redundant information in a computer, comprising:
    identifying two or more source documents that share a similar logical data tree structure,
    within the two or more source documents identifying matching documents that relate to the same configurable entity;
    applying a merge document to the matching documents to merge the matching documents into a resulting tree merge document, and to prune the logical data tree of the resulting document; and
    wherein applying the merge document into a resulting tree merge document further comprises specifying a first instruction to select information at a predetermined level the tree structure from a first matching document.

12. The service of claim 11, wherein applying the merge document comprises identifying a merge data tree structure of the merge document that is similar to the data tree structure.

13. The service of claim 11, wherein identifying comprises identifying two or more web documents.

14. The service of claim 11, wherein applying the merge document comprises specifying a condition that determines whether two source documents relate to the same configurable entity.

15. The service of claim 11, wherein applying the merge document further comprises specifying a second instruction to output only unique elements of the matching documents at a given level in the tree structure.

16. A service model for merging matching information in related documents and pruning data trees to remove redundant information in a computer, comprising:

An identification of two or more source documents that share a similar logical data tree structure;

within the two or more source documents identification of matching documents that relate to the same configurable entity;

an application of a merge document to the matching documents to merge the matching documents into a resulting tree merge document, and to prune the logical data tree of the resulting document; and wherein the application of the merge document into a resulting tree merge document further comprises specification of a first instruction to select information at a predetermined level in the tree structure from a first matching document.

17. The service model of claim 16, wherein the application of the merge document further comprises a specification of a second instruction to output only unique elements of the matching documents at a predetermined level in the tree structure.

18. The service model of claim 16, wherein the application of the merge document comprises an identification of a merge data tree structure of the merge document that is similar to the data tree structure.

* * * * *